United States Patent
Hopfner

(10) Patent No.: US 9,280,501 B2
(45) Date of Patent: Mar. 8, 2016

(54) COMPATIBLE NETWORK NODE, IN PARTICULAR, FOR CAN BUS SYSTEMS

(71) Applicant: Infineon Technologies AG, Neubiberg (DE)

(72) Inventor: Markus Hopfner, Rosenheim (DE)

(73) Assignee: Infineon Technologies AG, Neubiberg (DE)

( * ) Notice: Subject to any disclaimer, the term of this patent is extended or adjusted under 35 U.S.C. 154(b) by 369 days.

(21) Appl. No.: 13/871,043

(22) Filed: Apr. 26, 2013

(65) Prior Publication Data

US 2014/0215109 A1     Jul. 31, 2014

Related U.S. Application Data

(60) Provisional application No. 61/759,107, filed on Jan. 31, 2013.

(51) Int. Cl.
*H04L 12/40* (2006.01)
*G06F 13/36* (2006.01)
*G06F 13/40* (2006.01)

(52) U.S. Cl.
CPC ............ *G06F 13/36* (2013.01); *G06F 13/4072* (2013.01); *H04L 12/40006* (2013.01); *H04L 12/40032* (2013.01); *H04L 12/40169* (2013.01); *H04L 2012/40215* (2013.01); *H04L 2012/40273* (2013.01)

(58) Field of Classification Search
CPC ................ G06F 13/36; G06F 13/4072; H04L 12/40006; H04L 12/40032; H04L 12/40169; H04L 12/407; H04L 12/28; H04L 29/06; H04L 2012/40125
See application file for complete search history.

(56) References Cited

U.S. PATENT DOCUMENTS

| | | | |
|---|---|---|---|
| 5,524,213 A | 6/1996 | Dais et al. | |
| 6,847,316 B1 * | 1/2005 | Keller | 341/106 |
| 8,325,373 B2 | 12/2012 | Pilsl et al. | |
| 2013/0262723 A1 * | 10/2013 | Luttenbacher | 710/106 |
| 2014/0129748 A1 * | 5/2014 | Muth | 710/106 |

FOREIGN PATENT DOCUMENTS

JP     2011-182258     9/2011

* cited by examiner

*Primary Examiner* — Glenn A Auve
(74) *Attorney, Agent, or Firm* — Eschweiler & Associates, LLC

(57) ABSTRACT

A network node is provided, including a device, in particular, an error detection logic, which is deactivated if it is detected that a signal according to a first protocol or a first version of a first protocol is received, and which is not deactivated if it is detected that a signal according to a second, different protocol or a second, different version of the first protocol is received.

19 Claims, 3 Drawing Sheets

COMPATIBLE NETWORK NODE, IN PARTICULAR, FOR CAN BUS SYSTEMS

CROSS REFERENCE TO RELATED APPLICATIONS

This application claims priority to U.S. Provisional Patent Application Ser. No. 61/759,107 filed Jan. 31, 2013 entitled "Compatible Network Node, In Particular, for can Bus Systems," which is hereby incorporated by reference in its entirety.

FIELD

The disclosure relates to a network node, in particular, to a network node for CAN bus systems, and to a method of controlling a network node. Further, the disclosure generally relates to an electrical or electronic device, and more specifically, a device adapted to be connected to a bus, in particular, a CAN bus.

BACKGROUND

In electrical or electronic systems, various individual system modules, for instance various electronic/electric assemblies, various electronic/electric components, for instance various semiconductor components such as integrated circuits, etc., various sub-components, provided in one and the same component or integrated circuit etc., communicate via a transfer medium such as a bus system.

A bus system may comprise one or more transfer lines. Bus systems can be used jointly by several, in particular by two or more than two modules/components/elements of a respective system.

Many conventional bus systems comprise several partial systems, for example a data bus—consisting of one or more data lines—and/or an address bus—consisting of one or more address lines—and/or a control bus—consisting of one or more control lines—etc.

In comparison to this, other bus systems are of a much simpler construction. For example, a so-called IBCB bus (IBCB=Inter Block Communication Bus) in general merely comprises two transmission lines to connect two respective modules/components/elements.

Further examples for relatively simple bus systems are LIN busses (LIN=Local Interconnect Network), which generally comprise only one single transmission line, and CAN busses (CAN=Controller Area Network), which generally only comprise two or three lines (e.g., CAN_HIGH, CAN_LOW, and—optionally—CAN_GND (ground)), etc.

According to the CAN protocol, e.g., the CAN 2.0 protocol, each data frame transmitted via a CAN bus comprises a plurality of predefined fields (e.g., as defined in the "Base frame format"), e.g., a "start of frame" field, an "ID" field, a "DLC (Data length code)" field, followed by a "Data" field (containing the actual useful data to be transmitted), a "CRC (Cyclic redundancy checksum)" field, etc., and an "EOF (End of frame)" field.

Further, according to the CAN protocol, the data contained in the frames is transmitted at a predefined data rate, e.g., 1 Mbit/s in the case of a Highspeed bus, and, e.g., 125 kbit/s in the case of a Lowspeed bus.

To further enhance the data rate, the so-called CAN FD (CAN flexible data rate) protocol was defined.

According to the CAN FD protocol, the data contained in the "Data" field of a CAN frame (i.e., the actual useful data)—but not the data contained in the other fields of a CAN frame—is transmitted at a higher transmission rate, than prescribed in the CAN 2.0 protocol.

However, due to the above different data rates, CAN FD protocol modules/components/elements in general are not compatible with CAN 2.0 protocol modules/components/elements. Hence, problems may arise when both CAN FD protocol modules/components/elements and CAN 2.0 protocol modules/components/elements are connected to one-and-the-same CAN bus.

For these or other reasons there is a need for an improved network node, in particular, an improved network node for CAN bus systems, for an improved method of controlling a network node, and for an improved electrical or electronic device adapted to be connected to a bus, in particular, a CAN bus.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure will be readily appreciated, as they become better understood by reference to the following detailed description.

DETAILED DESCRIPTION

In the following detailed description, reference is made to the accompanying drawings, which form a part hereof, and in which is shown by way of illustration specific embodiments in which the disclosure may be practiced. It is to be understood that other embodiments may be utilized and structural or other changes may be made without departing from the scope of the present disclosure. The following detailed description, therefore, is not to be taken in a limiting sense, and the scope of the present disclosure is defined by the appended claims.

Figure 1:
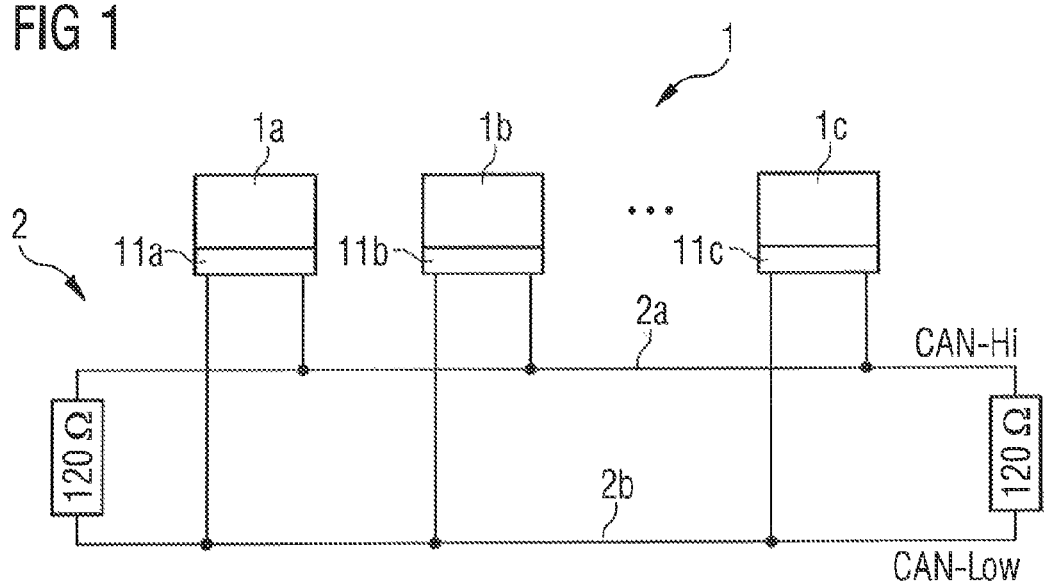
FIG. 1 depicts a schematic structure of an example electronic/electric system comprising a bus in which a network node with a protocol handler according to an embodiment of the disclosure may be employed.

FIG. 1 shows a schematic representation of an example electronic/electric system 1 comprising a bus in which a network node with a protocol handler according to an embodiment of the disclosure may be employed.

As shown in FIG. 1, the system 1 comprises a plurality of modules/components/elements 1a, 1b, 1c ("network nodes") which are connected over a bus 2.

The components 1a, 1b, 1c may e.g. be or comprise semiconductor components such as one or several integrated circuits, for instance, respective ASICS (ASIC=application specific integrated circuit), microprocessors, microcontrollers, etc., or any other kinds of integrated circuits or components comprising integrated circuits.

In one embodiment, the system 1 comprises a relatively high number of modules/components/elements 1a, 1b, 1c, e.g., more than two, in particular, more than five or ten modules/components/elements 1a, 1b, 1c, e.g. more than five or ten separate integrated circuits.

The bus 2 e.g. may comprise—as shown in FIG. 1—two respective transmission lines 2a, 2b, over which data may e.g. be transmitted in differential form. Alternatively, the bus may e.g. only comprise one single transmission line, or more than two, e.g., three or more than three transmission lines.

For example, the bus 2 may be a respective IBCB bus (IBCB=Inter Block Communication Bus), or LIN bus (LIN=Local Interconnect Network), or any other kind of bus. In one embodiment, the bus is a CAN bus (CAN=Controller Area Network), and comprises two or three transmission lines (e.g., a first transmission line 2a ("CAN_HIGH"), a second transmission line 2b ("CAN_LOW"), and—optionally—a third transmission line ("CAN_GND (ground)" (not shown)).

The above system 1 e.g. may be used in a vehicle, e.g., a car, a truck, a plane, a helicopter, a motorcycle, etc., in particular, in a car comprising a combustion engine, and/or an electric engine, or in any other device or system, e.g., in any kind of industrial control application, in any kind of automation environment, for instance, a washing machine, a dish washer, etc.

At least two of the modules/components/elements 1a, 1b, 1c connected to the bus 2 may use/work according to different protocols/bus protocols, or different versions of protocols/bus protocols.

As a result, one or several modules/components/elements 1a, 1b, 1c connected to the bus 2 (e.g., one or several components that use a first version of a protocol) may e.g. transmit and/or receive data—at least partly—at a higher data rate, than other modules/components/elements 1a, 1b, 1c connected to the bus 2 (e.g., one or several components that use a second version of the protocol).

For example, one or several modules/components/elements 1a, 1b, 1c connected to the bus 2 may use/work according to the CAN 2.0 protocol, and one or several other modules/components/elements 1a, 1b, 1c connected to the bus 2 may use/work according to the CAN FD (CAN flexible data rate) protocol.

According to the CAN protocol, each data frame transmitted via the bus 2 may comprise a plurality of predefined fields, e.g., a "start of frame" field, an "ID" field, a "DLC (Data length code)" field, followed by a "Data" field (containing the actual useful data to be transmitted), a "CRC (Cyclic redundancy checksum)" field, etc., and an "EOF (End of frame)" field.

The modules/components/elements 1a, 1b, 1c that work according to the CAN 2.0 protocol may transmit the data contained in the frames via the bus 2 at a first predefined data rate, e.g., 1 Mbit/s, e.g., a data rate prescribed in the CAN 2.0 protocol. This data rate is used by these modules/components/elements for all the data contained in a frame, i.e., the data contained in the "ID" field, "DLC" field, "EOF" field, etc., and the actual useful data contained in the "Data" field.

In contrast, the modules/components/elements 1a, 1b, 1c that work according to the CAN FD (CAN flexible data rate) protocol may transmit the data contained in the "Data" field of a CAN frame (i.e., the actual useful data)—but not the data contained in the other fields of a CAN frame (e.g., the data contained in the "ID" field, "DLC" field, "EOF" field, etc.)—at a higher transmission rate, than the above first predefined data rate, e.g., the data rate prescribed in the CAN 2.0 protocol. The data rate used for the data contained in the "Data" field ("second, higher data rate"/FD data rate) e.g. may be more than 10%, 25%, 50%, or more than 100% or more than 200% higher, than the above first predefined data rate, e.g., the data rate prescribed in the CAN 2.0 protocol.

As is shown in FIG. 1, each of the modules/components/elements 1a, 1b, 1c comprise a protocol handler 11a, 11b, 11c. The protocol handlers 11a, 11b, 11c may e.g. serve as direct interconnection to the bus 2.

A module/component/element working according to the CAN FD (CAN flexible data rate) protocol, e.g., the component 1b may comprise a conventional CAN FD protocol handler 11b, in particular, a protocol handler 11b using a relatively precise internal oscillator signal, e.g. provided by a relatively precise oscillator, e.g., a relatively precise quartz or crystal oscillator.

Figure 2:
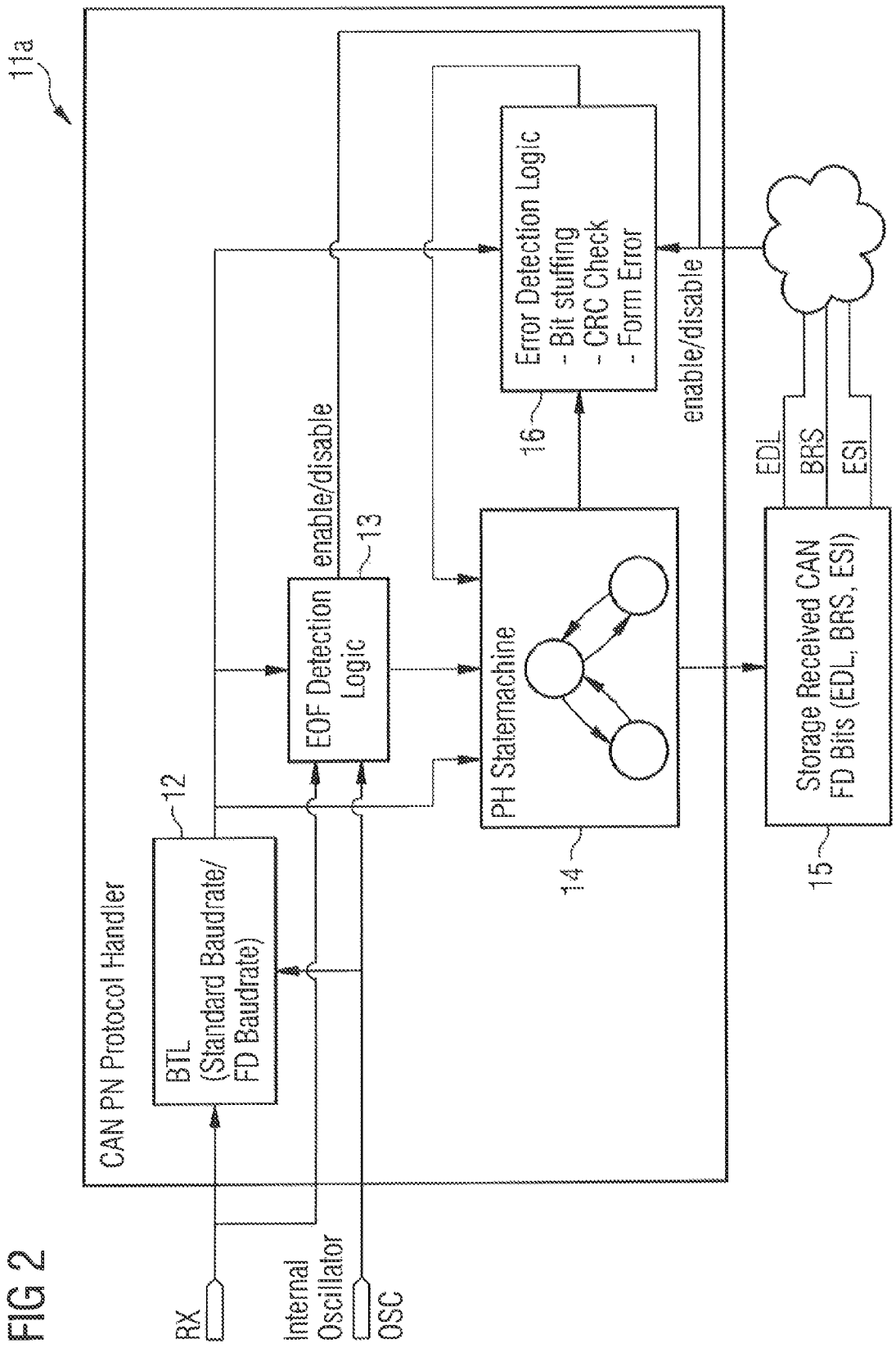
FIG. 2 schematically depicts an example of a protocol handler of a network node according to an embodiment of the disclosure.

In contrast, a module/component/element working according to the CAN 2.0 protocol, e.g., the component 1a may comprise a special protocol handler 11a, as by way of example shown in FIG. 2. The protocol handler 11a of the CAN 2.0 component may use a relatively unprecise internal oscillator signal OSC, e.g. provided by a relatively unprecise oscillator. In particular, the internal oscillator signal/oscillator used by the protocol handler 11a of the CAN 2.0 component 1a may be less precise than the oscillator signal/oscillator used by the protocol handler 11b of the CAN FD component 11b, e.g., more than 10%, 25%, 50%, or more than 100% or more than 200% less precise. Hence, a less complex, less big, less expensive, and/or less power consuming oscillator may be used.

Each module/component/element 1a, 1b, 1c connected to the bus 2 may e.g. be in a normal operating mode, or e.g. in a power saving mode. In a first variant of the embodiments shown in FIGS. 1 and 2, a respective protocol handler of a respective module/component/element 1a, 1b, 1c may bring the module/component/element 1a, 1b, 1c (or parts thereof, e.g., a microprocessor or microcontroller associated with the respective protocol handler) from the power saving to the normal operating mode whenever the protocol handler detects any data traffic on the bus 2. In a further, alternative variant, a respective protocol handler of a respective module/component/element 1a, 1b, 1c may bring the module/component/element 1a, 1b, 1c (or parts thereof) from the power saving to the normal operating mode only when the protocol handler detects data traffic on the bus 2 which is destined for the respective module/component/element 1a, 1b, 1c.

The protocol handler 11a, as shown in FIG. 2, may e.g. comprise a Bit Time Logic (BTL) 12, an EOF (End of frame) detection logic 13, a Statemachine 14, an error detection logic 16, and a storage 15, in particular, and a storage for received CAN FD control bits (EDL, BRS, ESI).

As is shown in FIG. 2, the signals RX received via the bus 2 are fed to the Bit Time Logic (BTL) 12, and the EOF (End of frame) detection logic 13. Correspondingly similar, the above internal oscillator signal OSC is fed to the Bit Time Logic (BTL) 12, and the EOF (End of frame) detection logic 13. The above signals RX may e.g. correspond to the above differential signals ("CAN_HIGH", "CAN_LOW") received on the above transmission lines 2a, 2b.

As explained above, the oscillator signal OSC used by the protocol handler 11a of the CAN 2.0 component 1a/the Bit Time Logic (BTL) 12 may be less precise than the corresponding oscillator signal used by a corresponding protocol handler of a corresponding CAN FD component (e.g., the protocol handler 11b of the CAN FD component 1b). In particular, the clock frequency of the oscillator signal OSC used by the protocol handler 11a of the CAN 2.0 component 1a/the Bit Time Logic (BTL) 12 may be high enough to allow fault-free or substantially fault-free sampling of data comprising the above first predefined data rate, e.g., the data rate prescribed in the CAN 2.0 protocol, but may be too low to allow fault-free or substantially fault free sampling of data comprising the above second, higher data rate (FD data rate).

As shown in FIG. 2, the data as sampled by the Bit Time Logic (BTL) 12 may then be provided to the above EOF (End of frame) detection logic 13, the Statemachine 14, and the error detection logic 16.

Other than conventional protocol handlers of conventional CAN 2.0 components, the protocol handler 11a of the CAN 2.0 component 1a may be adapted—by use of the statemachine 14—to also decode and make use of the (additional) CAN FD protocol data frame control field bits, i.e., the (additional) control bits provided according to the CAN FD protocol, but not provided according to the CAN 2.0 protocol.

Hence, in particular, the protocol handler 11a may be adapted to detect, by use of the statemachine 14, whether a received CAN data frame is a CAN 2.0 data frame, or is a CAN FD data frame.

For this purpose, the statemachine 14 may extract, from a received CAN data frame, the CAN FD relevant control bits EDL, BRS, and/or ESI, which may be stored in the above storage 15.

If it is detected that the received data frame is a CAN 2.0 data frame (or if it is detected that the received data frame is NOT a CAN FD data frame), the error detection logic 16 is kept active (or is activated), and a corresponding error detection, e.g., a bit stuffing, and/or CRC check/checksum check, and/or form error check is performed. Depending on the result of the error detection, in particular, if an error is detected, an error signal may be sent by the component 1a via the bus 2 to the other components 1b, 1c connected to the bus 2. If no error is detected (and/or if it is further detected that the data frame is destined for the component 1a), the component 1a may be brought to the normal operating mode (in case it still is in the above power saving mode).

If, in contrast, it is detected that the received data frame is a CAN FD data frame, the error detection logic 16 is deactivated (or kept deactivated). In this case, no error detection is performed, e.g., no bit stuffing, and/or no CRC check/checksum check, and/or no form error check is performed. Instead, the received CAN data frame is discarded. Further, the statemachine 14 may then perform a waiting loop, until an end of frame is detected (see below).

Hence, it is avoided that an error signal is sent by the component 1a via the bus 2 to the other components 1b, 1c connected to the bus 2, which would otherwise be very likely, as, as said, the clock frequency of the oscillator signal OSC used by the protocol handler 11a/Bit Time Logic (BTL) 12 is too low to allow fault-free or substantially fault free sampling of data comprising the above second, higher data rate (FD data rate), i.e., of the actual useful data comprised in the "Data" field of a CAN FD frame.

Further, as the received CAN FD data frame is discarded, it is avoided that the component 1a—erroneously—is brought to the normal operating mode (in case it still is in the power saving mode).

If then an end of frame (EOF field) is detected, the error detection logic 16 may again be activated, and/or the statemachine 14 may stop the above waiting loop.

Figure 3:
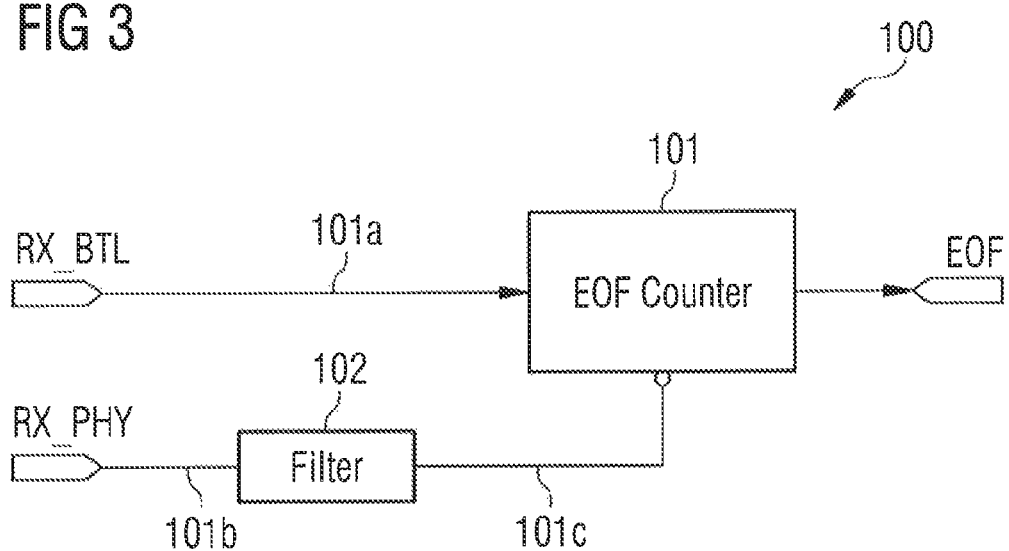
FIG. 3 schematically depicts an example of an end of frame detection logic according to an embodiment of the disclosure.

To detect the end of frame (EOF field) of the above CAN FD frame, an end of frame detection logic 100 as shown in FIG. 3 may be used in the component 1a. In one embodiment the end of frame detection logic 100 comprises a counter 101, and a filter/edge detection unit 102. The counter 101, via a line 101a, receives the bits as sampled by the Bit Time Logic (BTL) 12, i.e., as sampled by use of the above oscillator signal OSC, and counts the numbers of logical "1"s as received, via the line 101a, from the Bit Time Logic (BTL) 12.

The filter/edge detection unit 102, as shown in FIG. 3, is directly coupled, via a line 101b, to the bus 2/the respective physical layer thereof. Whenever there is activity on the bus 2/whenever an edge is detected as present on the bus, a bus activity detection/edge detection signal is sent, via a line 101c, from the filter/edge detection unit 102 to the counter 101, which then is reset to ZERO.

As soon as the counter has reached a count of seven (without having been reset in the meantime), an "end of frame" is detected.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

I claim:

1. A network node, comprising a circuit configured to be deactivated when a signal according to a first protocol or a first version of a first protocol is received, and configured to not be deactivated when a signal according to a second, different protocol or a second, different version of the first protocol is received, wherein the circuit comprises an error detection logic configured to perform bit stuffing, and/or a checksum check, and/or a form error check.

2. The network node of claim 1, wherein the first version of the first protocol comprises a first version of a CAN bus protocol, and the second, different version of the first protocol comprises a second, different version of a CAN bus protocol.

3. The network node of claim 1, wherein the first version of the first protocol is a CAN FD protocol, and the second version of the first protocol is a CAN 2.0 protocol.

4. A method of controlling a network node, comprising:
deactivating an error detection circuit associated with the network node if it is detected that on a bus a data frame according to a first protocol or a first version of a first protocol is present, wherein the error detection circuit configured to perform bit stuffing, and/or a checksum check, and/or a form error check.

5. The method of claim 4, further comprising:
not deactivating the error detection if it is detected that on the bus a data frame according to a second, different protocol or a second, different version of the first protocol is present.

6. The method of claim 5, wherein the first version of the first protocol is a CAN FD protocol, and the second version of the first protocol is a CAN 2.0 protocol.

7. The method of claim 4, comprising:
re-activating the error detection if an end of the data frame according to the first protocol or the first version of the first protocol is detected.

8. An electrical or electronic device, comprising a protocol handler adapted to perform the method of claim 4.

9. A system, comprising:
a first component configured to receive and/or transmit data according to a first protocol or a first version of a first protocol;
a second component configured to receive and/or transmit data according to a second, different protocol or a second, different version of the first protocol; and
a bus interconnecting the first and the second component;
wherein the first component and the second component each comprise an oscillator, the oscillator of the first component being more precise than the oscillator of the second component.

10. The system of claim 9, wherein the first component is configured to receive data at a first maximum data rate, and the second component is configured to receive data at a second maximum data rate, and wherein the second maximum data rate is lower than the first maximum data rate.

11. The system of claim 9, wherein the second component comprises an error detector configured to be deactivated if it is detected that a signal according to the first protocol or the first version of the first protocol is received, and configured to be not deactivated if it is detected that a signal according to the second, different protocol or the second, different version of the first protocol is received.

12. The system of claim 11, wherein the first version of the first protocol is a CAN FD protocol, and the second, different version of the first protocol is a CAN 2.0 protocol.

13. An electronic device, comprising:

a circuit configured to deactivate an error detection logic if it is detected that on a bus a data frame according to a first protocol or a first version of a first protocol is present, wherein the error detection circuit is configured to perform bit stuffing, and/or a checksum check, and/or a form error check.

14. The electronic device of claim 13, wherein the circuit is configured to not deactivate the error detection logic if it is detected that on the bus a data frame according to a second, different protocol or a second, different version of the first protocol is present.

15. The electronic device of claim 13, further comprising an end of frame detection logic.

16. The electronic device of claim 15, wherein the circuit is configured to re-activate the error detection logic if an end of the data frame is detected by the end of frame detection logic.

17. The electronic device of claim 15, wherein the end of frame detection logic comprises a counter.

18. The electronic device of claim 17, wherein the end of frame detection logic comprises a filter or edge detector.

19. The electronic device of claim 18, wherein the filter or edge detector is configured to reset the counter in response to detecting an activity on the bus.

\* \* \* \* \*